(12) United States Patent
Inoue et al.

(10) Patent No.: US 6,336,948 B1
(45) Date of Patent: Jan. 8, 2002

(54) FIRE-RETARDANT FILTER MEDIUM AND AIR FILTER UNIT

(75) Inventors: Osamu Inoue; Shinichi Chaen; Nobuki Uraoka; Toshio Kusumi; Jun Asano; Seiichi Hirano; Satoshi Hara, all of Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/230,784

(22) PCT Filed: Aug. 6, 1997

(86) PCT No.: PCT/JP97/02755

§ 371 Date: May 27, 1999

§ 102(e) Date: May 27, 1999

(87) PCT Pub. No.: WO98/06476

PCT Pub. Date: Feb. 19, 1998

(30) Foreign Application Priority Data

Aug. 9, 1996 (JP) .............................. 8-211637
Feb. 4, 1997 (JP) .............................. 9-021523

(51) Int. Cl.[7] .............................. B01D 46/00
(52) U.S. Cl. ..................... 55/486; 55/487; 55/497; 55/521; 55/524
(58) Field of Search ................ 55/486, 487, 488, 55/527, 524, 528, 497, 521; 95/287; 428/921; 96/11

(56) References Cited

U.S. PATENT DOCUMENTS

| | | |
|---|---|---|
| 2,728,407 A | 12/1955 | Squier |
| 3,246,758 A | 4/1966 | Wagner |
| 3,683,596 A | 8/1972 | Ashley |
| 3,909,489 A * | 9/1975 | Callander .............. 260/45.7 R |
| 4,025,679 A | 5/1977 | Denny |
| 4,075,106 A | 2/1978 | Yamazaki |
| 4,187,390 A | 2/1980 | Gore |
| 4,302,496 A * | 11/1981 | Donovan .................... 428/196 |
| 4,488,966 A | 12/1984 | Schaeffer |
| 4,707,167 A | 11/1987 | Saito et al. |
| 4,794,037 A * | 12/1988 | Hosoda et al. .............. 428/264 |
| 4,877,433 A | 10/1989 | Oshitari |
| 4,878,930 A | 11/1989 | Manniso et al. |
| 4,961,764 A | 10/1990 | Develle et al. |
| 4,983,434 A | 1/1991 | Sassa |
| 5,096,473 A * | 3/1992 | Sassa et al. ................... 55/486 |
| 5,098,767 A | 3/1992 | Linnerstein |

(List continued on next page.)

FOREIGN PATENT DOCUMENTS

| | | |
|---|---|---|
| JP | 51-134475 | 11/1976 |
| JP | 5-184844 | 7/1993 |
| JP | 5-202217 | 8/1993 |
| JP | 6-218899 | 9/1994 |
| JP | 8-325890 | 12/1996 |
| WO | WO 90/15713 | 12/1990 |
| WO | WO 91/08829 | 6/1991 |
| WO | WO 93/23137 | 11/1993 |
| WO | WO 94/16802 | 8/1994 |
| WO | WO 94/16891 | 8/1994 |

OTHER PUBLICATIONS

Japan Air Cleaning Association/Filter Medium Standard Commission, Method of Testing Flammability of Filter Medium Used in Air Cleaner, Nov. 4, 1977 (w/partial English translation).

Primary Examiner—Duane Smith
Assistant Examiner—Jason M. Greene
(74) Attorney, Agent, or Firm—Merchant & Gould P.C.

(57) ABSTRACT

A filter medium with excellent flame-resistant properties and an air filter unit using the same are provided which have a flame-resistant air permeable supporting material on at least one surface of a polytetrafluoroethylene (PTFE) porous film and which can be used as a ceiling device, etc.

10 Claims, 5 Drawing Sheets

U.S. PATENT DOCUMENTS

| | | |
|---|---|---|
| 5,207,812 A | 5/1993 | Tronto et al. |
| 5,224,974 A * | 7/1993 | Johnson ........................ 55/486 |
| 5,234,739 A | 8/1993 | Tanaru et al. |
| 5,236,480 A | 8/1993 | Svensson et al. |
| 5,318,831 A * | 6/1994 | Hirama et al. ............... 428/280 |
| 5,342,673 A * | 8/1994 | Bowman et al. ............ 428/198 |
| 5,409,515 A | 4/1995 | Yamamoto et al. |
| 5,418,054 A | 5/1995 | Sun |
| 5,470,485 A | 11/1995 | Morweiser et al. |
| 5,507,847 A * | 4/1996 | George et al. ................. 55/486 |
| 5,527,569 A | 6/1996 | Hobson et al. |
| 5,624,478 A | 4/1997 | Patapanian et al. |
| 5,837,040 A | 11/1998 | Caughron et al. |
| 6,027,553 A * | 2/2000 | Hirano et al. .................. 55/497 |
| 6,261,979 B1 * | 7/2001 | Tanaka et al. ................. 55/521 |

\* cited by examiner

FIRE-RETARDANT FILTER MEDIUM AND AIR FILTER UNIT

TECHNICAL FIELD

This invention relates to a filter medium applied for cleaning air in e.g., a clean room, and an air filter unit using the same. More specifically, this invention relates to a filter medium applied for cleaning air in manufacturing electronic members such as semiconductors and liquid crystals, and an air filter unit using the same.

BACKGROUND ART

As filters applied for cleaning air in e.g., a clean room, the inventors of this invention have already disclosed a polytetrafluoroethylene (referred to as PTFE hereinafter) porous film (for example, Japanese Patent Application Tokkai Hei 5-202217). In addition, the lamination of a thermoplastic material such as a span bond nonwoven cloth made of sheath-core structured long fibers onto both the surfaces of the PTFE porous film was also proposed so as to protect the porous film from scratches and pin holes (Japanese Patent Application Tokkai Hei 6-218899).

However, the inventors of this invention found in accordance with the Standard of Test Method for Combustion of Air Filter Media (JACA No. 11-1977) that the prior art mentioned above has unsatisfactory flame-resistant properties.

A flame-resistant filter medium, and an air filter unit using the same are sometimes fixed to a ceiling as equipment. In this case, particularly, flame-resistant properties are required so as to prevent fire.

DISCLOSURE OF INVENTION

This invention aims to solve the above-mentioned conventional problems by providing a flame-resistant filter medium and an air filter unit using the same.

In order to achieve the above purposes, the flame-resistant filter medium of this invention is a filter medium comprising a gas permeable supporting material on at least one surface of a PTFE porous film and which has 150 mm or less maximum carbonized length based on the Standard of Test Method for Combustion of Air Filter Media (JACA No. 11-1977). The flame-resistant properties in this invention are measured by the Standard of Test Method for Combustion of Air Filter Media (JACA No. 11-1977) prepared by the Filter Standard Committee of JAPAN AIR CLEANING ASSOCIATION (JACA).

It is preferable that the air permeable supporting material of the flame-resistant filter medium is a flame-resistant air permeable supporting material.

The PTFE porous film can be one or more layers in the flame-resistant filter medium of this invention. As the flame-resistant filter medium, an air permeable supporting material is applied on one surface of the PTFE porous film, on both surfaces of the porous film, or is alternately or randomly applied altogether with the porous film. Particularly, the filter medium in which the supporting material is applied on both surfaces of the porous film is preferable.

There is no particular limitation on the PTFE porous film, and a conventional PTFE porous film may be applied to the flame-resistant filter medium. A PTFE porous film that can provide the efficient scavenging of floating fine particles and has properties such as pressure loss (the same or better properties than an HEPA filter and ULPA filter) required for a filter unit applied in a clean room for manufacturing semiconductors, liquid crystals, etc. and in manufacturing devices is especially preferable. For instance, pressure loss is preferably 10–100 mmH$_2$O when air is permeated at the flow velocity of 5.3 cm/second, and the scavenging efficiency of 0.10–0.12 μm dioctylphthalate (DOP) is preferably 99.0% or more. The PTFE porous films with such properties are described in detail in Japanese Patent Application Tokkai Hei 5-202217 and WO 94/16802, the disclosure of which are incorporated herein by reference.

The above-noted PTFE porous films applied in this invention can easily be prepared by a conventional method. The method includes, for example, the steps of extruding a paste of a PTFE fine powder and an extrusion assistant, providing a tape by pressing and spreading the extruded paste, and stretching out the non-baked or semi-baked paste in two axial directions. This method is specifically explained in Tokkai Hei 5-202217, WO 94/16802, etc.

In the flame-resistant filter medium of the invention, the air permeable supporting material is preferably a flame-resistant air permeable supporting material, or more preferably an organic-particularly, resinous-flame-resistant air permeable supporting material.

The air permeable supporting material of the flame-resistant filter medium is preferably a nonwoven fabric or woven cloth, or more preferably a resinous nonwoven fabric. Air permeable supporting materials made of glass fibers such as glass fiber nonwoven fabric, glass fiber paper and a glass fiber air filter medium are not preferable since they generate boron (B).

It is also preferable that the air permeable supporting material of the flame-resistant filter medium is made of at least one material selected from the group consisting of polyester and polyamide. It is further preferable that the air permeable supporting material is made of polyester fibers, and contains no polyolefin. The polyester mentioned above indicates polyethylene terephthalate (PEI), polybutylene terephthalate (PBI), and the like.

A flame retardant in the flame-resistant filter medium is preferably copolymerized. It is preferable that the flame retardant is copolymerized particularly to polyester fibers. In adding flame-resistant properties by e.g., organic phosphorous compounds, phosphorus (P) would not be detected from a filter medium if the flame retardant is copolymerized.

The polyester fiber material of the flame-resistant filter medium may be filaments nonwoven fabric.

The air filter unit of this invention uses a filter medium having an air permeable supporting material at least on one surface of the PTFE porous film. The filter medium is bent in wave forms and kept in the supporting body (frame), and the periphery is sealed. The filter medium has 150 mm or less maximum carbonized length according to the Standard of Test Method for Combustion of Air Filter Method (JACA No. 11-1977).

Conventional methods of kneading, copolymerizing or coating compounds having flame-resistant properties onto the fiber surface may be used as a means to add flame-resistant properties. For example, polyester fibers become flame-resistant after a flame retardant such as an organic phosphorous compound is copolymerized or kneaded to the fiber, or the fiber can be given flame-resistant properties by polymer blend or the like. More specifically, the following methods can be applied.

(1) Use of Flame-Resistant Materials

Flame-resistant fibers having flame-resistant properties in themselves include organic or inorganic fibers such as aromatic polyamide fibers, modified acrylic fibers, flame-resistant polynosic, flame-resistant vinylon, flame-resistant polyester, oxidation acrylic fibers (flame proof fibers), rayon carbonized fibers (flame proof fibers), aramid fibers, polyarylate fibers, phenol fibers, polybutylene isocyanate fibers (PBI fibers), polyvinylidene chloride fibers, asbestos, carbon fibers, metalfibers, and silica fibers, PTFE fibers, tetrafluoroethyleneperfluoroalkylvinylether copolymer (PFA) fibers, and polyvinylidene fluoride (PVdF) fibers.

(2) Flame-resistance Treatments

Flame-proof and flame-resistant properties are added by treatments such as a method of applying a flame retardant by a dipping or a coating process after preparing a thread, woven cloth, or nonwoven fabric from fibers.

In case of synthetic fibers, the treatments include a method of introducing a flame retardant by chemical bonding such as covalent bonding in preparing polymer, and a method where the fibers are kneaded in polymer or blended with polymer in melting, extruding and spinning processes.

The flame retardant includes inorganic flame retardants such as aluminum hydroxide, decabro-based bromine flame retardants such as decabromodiphenyloxide, nondeca-based bromine tetrabromobisphenol, chlorine-based flame retardants, and phosphorous flame retardants.

By mixing (spinning) flame-resistant and non-flame resistant fibers together, a thread, woven cloth or nonwoven fabric as a whole can be provided with stronger flame-resistant properties. The examples are a material in which flame-resistant acrylic fibers and cotton are spun together (DELAILA manufactured by Kurabo Industries Ltd.), and a nonwoven fabric (TEISEN PAIKU manufactured by Teikoku Seni Co., Ltd.) in which carbonized fibers (pre-carbon) and aramid fibers (Kevler) are mixed and spun.

The following have added flame-resistant properties: a nonwoven fabric in which polyvinylidene (PVC) and polyethylene (PE) are mixed, and a thread in which polyvinylidene fluoride (PVdF) and polyester fibers are mixed and spun.

When polyester fibers are used for the filter medium as a material, the material is preferably a nonwoven fabric, particularly a nonwoven fabric made of filaments (filament fibers). The examples are a PET nonwoven fabric in which a flame retardant such as phosphorus (P) compounds is copolymerized, a nonwoven fabric of sheath-core fibers comprising a high melting point PET (core section) and a low melting point PET (sheath section) where the above-noted flame retardant is copolymerized, a nonwoven fabric of sheath-core fibers comprising a high melting point PET (core section) and PBT (sheath section) where the above-noted flame retardant is copolymerized, and the like. When nonwoven fabrics are made from filaments, the fabrics are formed in melting and spinning processes (spinning direct nonwoven fabric), so that the fabrics are kept in a clean condition from the beginning. Nonwoven fabrics can be prepared from filaments by e.g., the span bond method, flash spinning method, melt-blowing method, or the like.

A card has to be passed through for opening when short fibers are used for a nonwoven fabric. In order to facilitate the passage, oil is added. Therefore, the oil has to be removed from the fabric in preparation for usage. The unwoven fabrics are formed from short fibers by the needle punch method, water jet method, stitch bond method, or the like.

It was found that a filter medium having a flame-resistant air permeable supporting material (nonwoven fabric made of polyester fibers, particularly, nonwoven fabric made of filaments) on at least one surface of a PTFE porous film generated little total organic carbon (mentioned as TOC hereinafter). In this invention, TOC indicates the total of various gaseous organic materials such as dodecane, tridecane, dioctylphthalate, siloxane and the like. Little generation of TOC and inorganic materials (such as phosphorus in a cleaned air space such as a clean room) can improve the qualities of semiconductors, liquid crystals, and the like in manufacturing processes.

In the filter medium, a PTFE porous film and a flame-resistant air permeable supporting material can be adhered to each other by a hot-melt adhesive, so that the porous film and the supporting material would be in one body. In addition, with the hot-melt adhesive, the generation of TOC is reduced.

Particularly, a PTFE porous film and an air permeable supporting material (nonwoven fabric made of polyester fibers in which a flame retardant is copolymerized, especially filaments nonwoven fabric) bonded by a polyester-based hot-melt adhesive are preferable.

Polyester fiber materials adhered by the hot-melt adhesive include high melting point PET fibers, low melting point PET fibers, nonwoven fabrics made of mixed fibers of high melting point PET fibers and low melting point PET fibers, nonwoven fabrics of sheath-core fibers comprising a high melting point PET (core section) and a low melting point PET (sheath section), nonwoven fabrics of sheath-core fibers comprising a high melting point PET (core section) and a PBT (sheath section), and the like.

Adhering methods include conventional methods, or more preferably a spray coating method, a spiral spray coating method, a slot spray coating method, a melt blown coating method, a print wheel coating method, a ribbon rip coating method, and the like so as to maintain the permeability of the air permeable supporting material.

The nonwoven fabrics are made of polyester fibers in which a flame retardant (for example, phosphorous compounds) is copolymerized. Nonwoven fabrics comprising at least PBT such as PBT fiber nonwoven fabrics, nonwoven fabrics of sheath-core fibers comprising PET (core) and PBT (sheath), and mixed nonwoven fabrics of PET fibers and PBT fibers can be adhered to a PTFE porous film by heat (heat roller) at temperature below the melting point of an air permeable supporting material. In this case, no adhesive is used. It is particularly preferable since there is little generation of TOC.

It is preferable that mini-pleated filter filaments having a band or ribbon spacer made of a hot-melt adhesive are kept in the above-mentioned filter unit. Since the air filter unit has a mini-pleated structure, the entire area of the filter can be used efficiently used, so that the filter preferably can be applied to the manufacture of electronic devices or machine such as semiconductors, liquid crystals and the like.

In the above-noted air filter unit, a sealing section between the supporting body and the filter medium is sealed with a hot-melt adhesive. Little TOC is generated from a hot-melt adhesive.

As described above, this invention provides a filter medium with excellent flame-resistant properties and an air filter unit using the same.

Mainly, a PTFE porous film is used for an air cleaning filter medium and an air filter unit using the same.

BEST MODE FOR CARRYING OUT THE INVENTION

Figure 1:
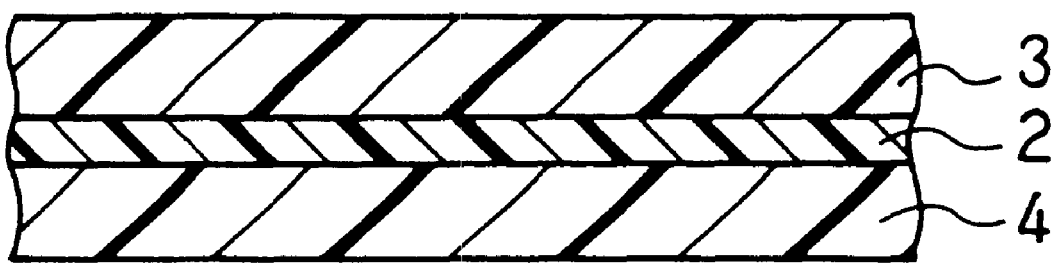
FIG. 1 is a cross-sectional view of a filter medium of one embodiment of the present invention.

This invention is explained below in further detail by referring to the drawings.

FIG. 1 is a cross-sectional view of a filter medium of one embodiment of the invention. In FIG. 1, 1 indicates a filter medium; 2 is a 4 μm thick PTFE layer having 2 g/m$^2$ basis weight; and 3 and 4 are flame-resistant polyester filaments span bond nonwoven cloths (for example, HEIM manufactured by Toyobo Co., Ltd.; size (single fiber thickness): 2 denier; and 15–100 g/m$^2$, more preferably 20–70 g/m$^2$ basis weight). 1–20 g/m$^2$, more preferably 2–10 g/m$^2$, of a polyester-based hot-melt adhesive is coated so as to adhere PTFE layer 2 to flame-resistant span bond nonwoven cloth layers 3 and 4, and is then adhered by heat at 160–200° C. The entire thickness of filter medium 1 is 100–1,500 μm, more preferably 100–70 μm. Filter medium 1 preferably has 10–100 mmH$_2$O (at 5.3 cm/sec) pressure loss, 99.0% or more scavenging efficiency (at 5.3 cm/sec, 0.1 μm) of DOP having 0.10–0.12 μm particle diameter, and 0.2–3 μm pore diameter.

Figure 2:
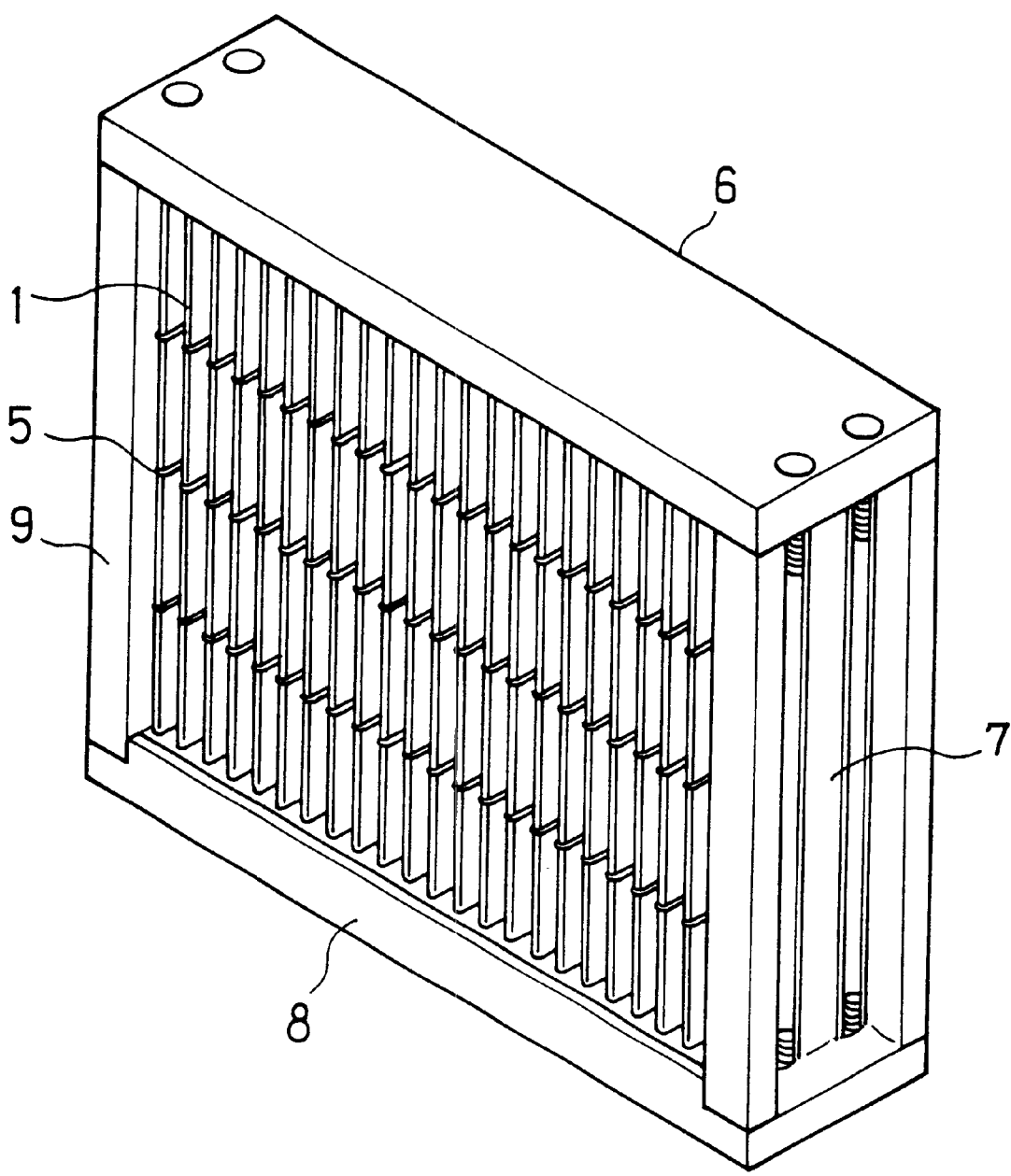
FIG. 2 is a perspective view of an air filter unit of one embodiment of the present invention.

FIG. 2 is a perspective view of an air filter unit of one embodiment of the invention. In the figure, 1 indicates the filter medium mentioned above, 5 is a band- or ribbon-shaped spacer made of a hot-melt adhesive (for example, Diabond (trademark)), and 6–9 are frames. Filter medium 1 is folded up at widths of about 40 mm. When the filter medium is seen from the front, around 2 mm wide gaps (gaps between the tops) are formed by spacer 5. The gaps between the rows of spacer 5 are preferably within around 10–50 mm, more preferably about 25 mm. The periphery of filter medium 1 and the inside surface of frames 6–9 are sealed with a hot-melt adhesive (e.g., Diabond) so as to prevent air leakage.

Figure 3:
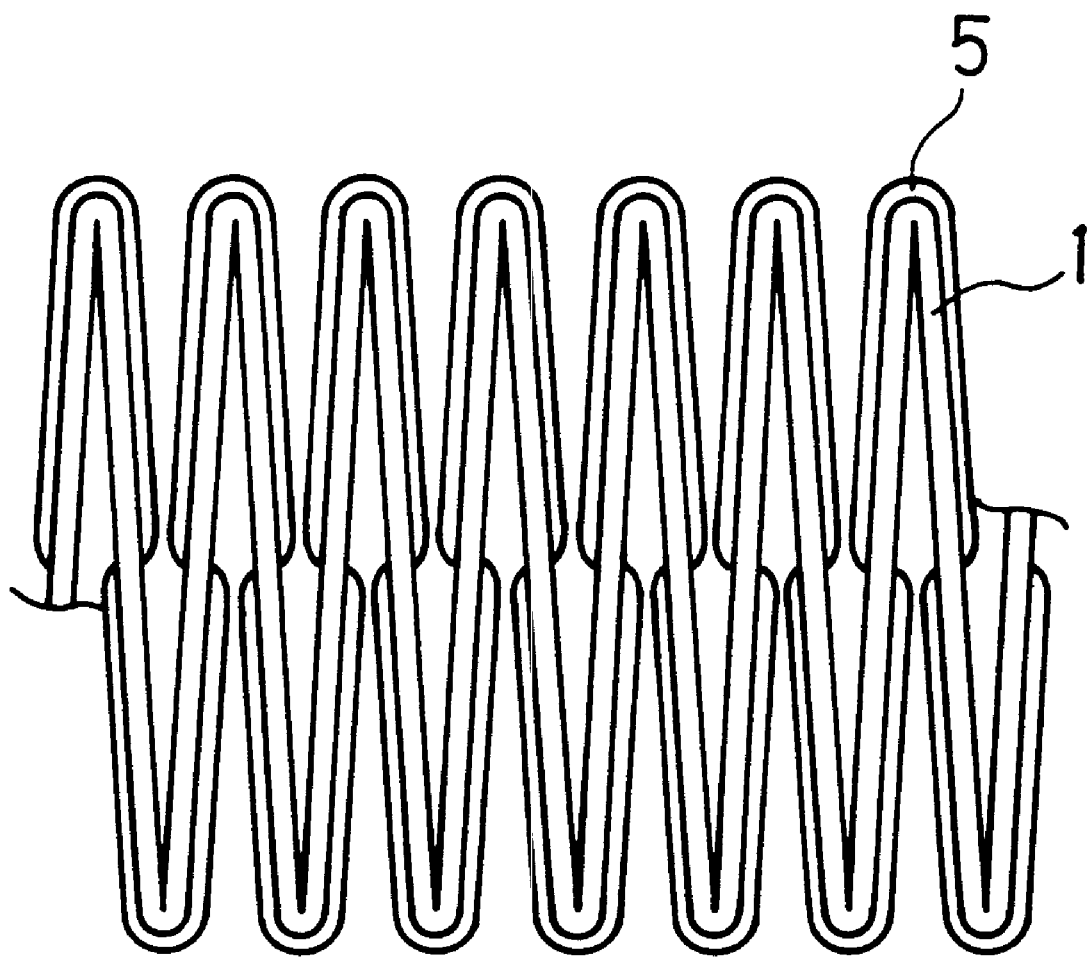
FIG. 3 is a cross-sectional view of a spacer shown in FIG. 2.

FIG. 3 shows a cross section of spacer 5 shown in FIG. 2. Spacer 5 is adhered over a length around 20 mm from the outside toward the center of filter medium 1, and the thickness of spacer 5 is around 1 mm. Because of spacer 5, air can uniformly permeate through filter medium 1.

The invention is explained below in further detail by referring to examples. In the following examples, pressure loss, permeability, scavenging efficiency, and amount of organic and inorganic materials are detected by the following methods.

I. Pressure Loss Measuring Method

A sample was cut into a circle 47 mm in diameter, and was then set on a holder having a 12.6 cm$^2$ permeation effective area. Pressure loss was measured at 5.3 cm/sec air velocity.

II. Permeability

A sample was set on a holder 100 mm in diameter, and the flow of air permeating through the sample was set at 5.3 cm/sec. In this condition, highly dispersed DOP (dioctylphthalate) particles of 10$^7$/300 ml concentration were introduced upstream of the sample. The number of particles having 0.1 μm particle diameter was counted at the upstream and downstream sides of the sample by a particle counter (LAS-X-CRT by PMS Co., Ltd.), and the permeability (%) of particles was found from the ratio.

III. Scavenging Efficiency (%)

Scavenging efficiency (%)=100−Permeability (%)

IV. Measurement of Organic Materials

A filter medium sample was weighed (1.0–5.0 g, more preferably 1.5–3.0 g), and was sealed in a glass container. The filter medium was then cleaned at room temperature (25° C.) by permeating pure air (AIR-Zero-A manufactured by Sumitomo Seika Chemicals Co., Ltd.) at 0.1 liter/min for 24 hours. An activated carbon tube (8015 manufactured by Shibata Chemical Equipment Co., Ltd.; 200 mg activated carbon; 20–40 mesh) was placed at the gas outlet section of the glass container. At room temperature, pure air was permeated at 0.1 liter/min for 24 hours, and off gas was scavenged. After the scavenging, the activated carbon was extracted by 1 milliliter carbon disulfide (desorption solvent), and the organic materials of the solution were detected by a gas chromatograph mass spectrometer (GC-MS). The GC-MS (QP-1000) is manufactured by Shimadzu Corp, and the separation column was 1 m of OV-1 (1%). In order to detect all the organic gas, the oven of the GC-MS was kept at 50° C. for five minutes, and was raised to 250° C. at 10° C./min and then kept there for two minutes and thirty seconds. The information on detected organic material was taken every second for detection, and was analyzed. In this invention, however, the identification accuracy of organic materials was not a concern, but the amount of the materials detected above the allowable limit was important.

The measured value of detected organic materials is based on a working curve prepared with toluene. Thus, the detected value of organic materials per gram of a filter medium was measured value/sample value (g). In the above-noted measurement method, the allowable detected limit from a blank test condition was 1 ng.

V. Measurement Method of Inorganic Materials (Such as P)

A filter medium sample was weighed (4.0 g), and was placed in a thoroughly washed tetrafluoroethylene-perfluoroalkylvinylether copolymer (PFA) container. Then, 150 cc pure water was added, and was sealed. The PFA container was shaken for seventy two hours in a clean booth below room temperature, and a solution in the container was detected by ICP-AES (306 SUPER SCAN manufactured by Hitachi, Ltd.).

VI. Standard of Test Method for Combustion of Air Filter Media (JACA No. 11-1977)

1. Application

This test method prescribes the standard of test method for combustion of air filter media applied for air cleaners.

2. Specimen (1) Size: 250 mm×250 mm (2) Quantity: five specimens

3. Extraction of Specimen

The extraction of specimens is carried out by simply removing a specimen of the required size from a targeted object.

4. Preceding Treatment of Specimen

Before the test is carried out, a specimen is kept in a constant-temperature drying oven at 50±12° C. for twenty-four hours. However, if the specimen is unaffected by this heat, it could be left in a constant-temperature drying oven at 105±2° C. for one hour, instead. Then, the specimen is left in a desiccator containing silica gel for one hour.

Figure 4A:
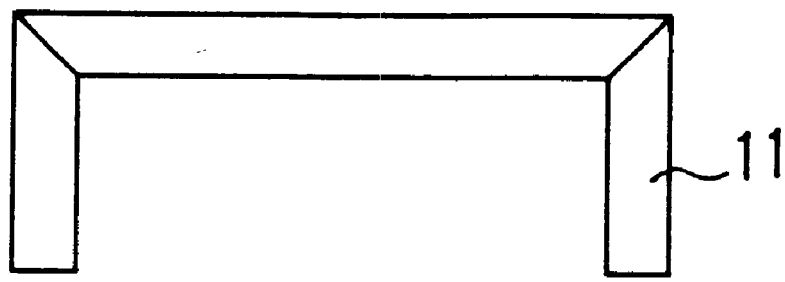
FIG. 4A is a front of view of a supporting frame of Standard of Test Method for Combustion of Air Filter Media (JACA No. 11-1977).
Figure 4B:
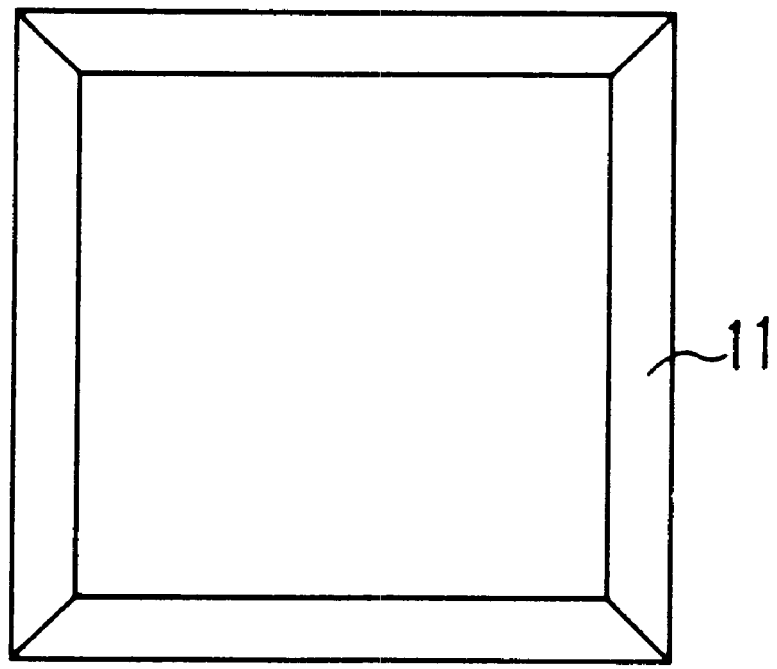
FIG. 4B is a plan of view of a supporting frame of Standard of Test Method for Combustion of Air Filter Media (JACA No. 11-1977).
Figure 5:
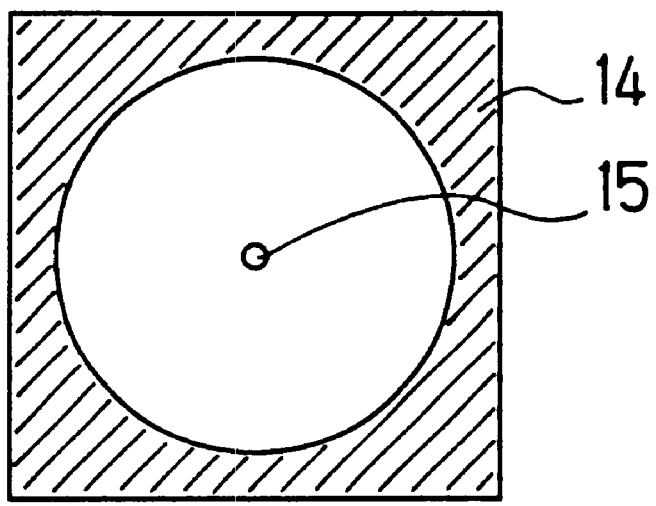
FIG. 5 is a plan of view of a Metal Frame of Standard of Test Method for Combustion of Air Filter Media (JACA No. 11-1977).
Figure 6:
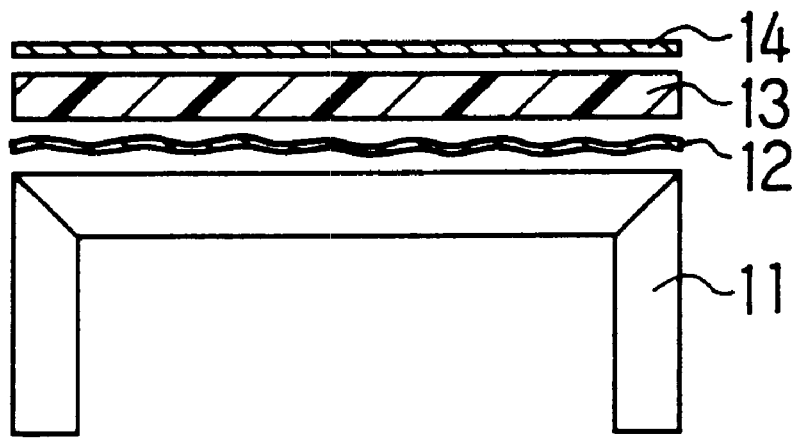
FIG. 6 is a Testing Process of a Metal Frame of Standard of Test Method for Combustion of Air Filter Media (JACA No. 11-1977).

5. Testing Device
   (1) Supporting Frame 11
   A 250 mm (inner side: 200 mm)×250 mm (inner side: 200 mm) metallic square shown in FIG. 4A (a front view) and FIG. 4B (a plan view) with 100 mm leg length is used for supporting a specimen and providing sufficient permeability.
   (2) Wire Gauze 12
   A circumferentially reinforced 250 mm×250 mm 20 mesh (standarized by JIS G 3555 woven wire gauze) is used.
   (3) Metal Frame 14
   A 250 mm×250 mm square metallic plate shown in FIG. 5 (with 1.6 mm or more thickness) having a circular hole of 200 mm diameter at its center and having enough weight to hold the specimen onto the wire gauze 12 is used.
   (4) Heat Source
   Hexamethylenetetramine (0.15 g; 6.4 mm diameter; and 4.3 mm thickness).
   (5) Scale
   1 mm scale.
6. Testing Process
   (1) Each specimen is removed from the desiccator. After placing the wire gauze 12 on the supporting frame 11 as shown in FIG. 6, the specimen 13 is placed on the gauze 12. The metal frame 14 is also placed over the specimen 13, and the circumference of the specimen is pressed 14. The heat source is then placed on the center 15 of the specimen 13, and is ignited by a match.
   Combustion conditions are examined, and the maximum length of a carbonized section along the central line of a specimen is measured, thus measuring the average values of five specimens.
7. Evaluation
   (1) Flame-resistant filter media are those with 150 mm or less maximum carbonized length. When the tests are carried out on both front and back surfaces of the specimen, the longer maximum carbonized length is evaluated.
   (2) The following conditions are recorded:
      (a) when particularly unusual combustion conditions are found from five specimens.
      (b) when the heat source is maintained.

EXAMPLE 1

A flame-resistant polyester filaments span bond nonwoven fabric (HEIM (H6401B) manufactured by Toyobo Co., Ltd.; size: 2 denier; weight: 40 g/m² was used as layers 3 and 4, and 3 g/m² of a polyester-based hot melt adhesive (Diabond DH598B manufactured by Nogawa Chemical Co., Ltd.) was coated on one surface of the layers.

A PTFE porous film was used as PTFE layer 2, and was laminated with layers 3 and 4. The layers were adhered to each other in one body by a heat roller at 180° C. at 10 m/min line speed. As a result, a filter medium 1 was prepared having 0.35 μm average pore diameter, 42 mmH$_2$O pressure loss, 0.0000027% permeability, and 99.99995% particle collection efficiency.

A combustibility test (JACA No. 11-1977) was carried out on the filter medium, and the medium had 95 mm maximum carbonized length and passed for the standards as a flame-resistant medium.

It was found that the amount of detected organic materials per gram of the filter medium was less than the allowable limit (1 ng) when the detected organic materials (1.5 g) were tested, and no phosphorus (P) was detected. The detected amounts of inorganic materials are shown in the following Table 1.

EXAMPLE 2

A flame-resistant filaments span bond nonwoven fabric having a sheath-core structure (PET (core)/PBT(sheath)) BULCOMPO HPH6060G manufactured by Toyobo Co., Ltd.; size: 8 denier; weight: 60 g/m²) was used as layers 3 and 4. A PTFE porous layer 2 was laminated with layers 3 and 4. The layers were adhered to each other in one body by a heat roller at 250° C. at 10 m/min line speed. As a result, a filter medium 1 was prepared having 40 mmH2O pressure loss and 99.99995% particle collection efficiency.

A combustibility test (JACA No. 11-1977) was carried out to the filter medium, and the medium which had 95 mm maximum carbonized length and passed for the standards as a flame-resistant medium.

It was found that the amount of detected organic materials per gram of the filter medium was less than the detection limit (1 ng) when the detected organic materials (1.5 g) were tested, and no phosphorus (P) was detected. The detected amounts of inorganic materials are shown in the following Table 1.

COMPARATIVE EXAMPLE 1

A layer 3 was a filaments span bond nonwoven fabric (ELEVES T0703WDO manufactured by Unitika Ltd.; size: 3 denier; weight; 70 g/m²) having a core/sheath structure and comprising polyethylene and polyester. Polyethylene was used for the sheath section of a layer 4. The core of layer 4 was a two-layer span bond nonwoven cloth (ELLEFIT E0303WTO manufactured by Unitika Ltd.; size: 3 denier; weight; 30 g/m²) comprising two kinds of fibers—a core/sheath structured conjugated fiber having a polyester core section and a core/sheath structured conjugated fiber having a modified polyester sheath section and a polyester core section.

A PTFE porous film was used as a PTFE layer 2. Three layers 2, 3 and 4 were laminated, and were adhered to each other into one body by a heat roller at 200° C. at 10 m/min line speed, thus preparing a filter medium.

According to a combustibility test (JACA No. 11-1977), the filter medium had 200 mm or more maximum carbonized length and did not satisfy the standards (150 mm or below maximum carbonized length) as a flame-resistant medium.

As in Example 1, the organic materials per three grams of the filter medium were detected. Per 1 g filter medium, organic materials such as dodecane (3 ng), tridecane (4 ng), etc. were detected.

EXAMPLE 3

A polyester thermal bond flame-resistant nonwoven fabric (KURANBON TRA9037 manufactured by Kurabo Industries Ltd.; weight: 90 g/m²; nonwoven cloth coated with a phosphorous flame retardant) was used as layers 3 and 4, and a polyester-based hot melt adhesive (Diabond DH598B manufactured by Nogawa Chemical Co., Ltd.) was coated on one surface of the layers at 3 g/m².

A PTFE porous film was used as a PTFE layer 2. Three layers 2, 3 and 4 were laminated, and were adhered to each other into one body by a heat roller at 180° C. at 10 m/min line speed. As a result, a filter medium 1 was provided having 45 mmH2O pressure loss and 99.9999973% particle collection efficiency.

According to a combustibility test (JACA No. 11-1977), the filter medium had 115 mm maximum carbonized length and satisfied the standards as a flame-resistant medium. The detected amounts of inorganic materials are shown in the following Table 1.

TABLE 1

| Inorganic Material | Example 1 | Example 2 | Example 3 |
|---|---|---|---|
| P | ND | ND | 632.5 |
| Ca | ND | 0.2 | ND |
| Mg | 0.7 | ND | 4.4 |
| Al | ND | ND | ND |
| Fe | ND | ND | ND |
| Cu | ND | ND | ND |
| Zn | ND | ND | ND |

Note: (1) Unit is ppb. (2) ND indicates 1 ng or less detection limit per gram of filter medium.

Industrial Applicability

As described above, this invention provides a filter medium with excellent flame-resistant properties, and an air filter unit using the same. Particularly, a filter medium of this invention having an air permeable supporting material in which a flame retardant is copolymerized generates no inorganic materials such as phosphorus (P). Also, no inorganic materials such as phosphorus (P) and TOC are generated from a filter medium of this invention comprising polyester and having an air permeable supporting material in which a flame retardant is copolymerized. Thus, an air filter unit of this invention is used as a part of a ceiling apparatus for the manufacturing machines of electronic devices (such as semiconductors and liquid crystals) while satisfying flame-resisting standards.

What is claimed is:

1. A flame resistant filter medium comprising an air permeable supporting material on at least one surface of a polytetrafluoroethylene (PTFE) porous film; said flame-resistant filter medium having a maximum carbonized length of 150 mm or less when tested according to the Standard of Test Method for Combustion of Air Filter Media (JACA No. 11-1977) and a pressure loss of 10–100 mmH$_2$O when air permeates the filter medium at a flow velocity of 5.3 cm/second.

2. The flame-resistant filter medium according to claim 1, wherein the air permeable supporting material is a flame-resistant air permeable supporting material.

3. The flame-resistant filter medium according to claim 1, wherein the air permeable supporting material is a flame-resistant air permeable supporting material in which a flame retardant is copolymerized.

4. The flame-resistant filer medium according to claim 2, wherein the air permeable supporting material comprises at least one material selected from polyester and polyamide.

5. The flame-resistant filter medium according to claim 3, wherein the air permeable supporting material comprises at least one material selected from polyester and polyamide.

6. The flame-resistant filter medium according to claim 4, wherein the polyester is at least one resin selected from the group consisting of polyethylene terephthalate and polybutylene terephthalate.

7. The flame-resistant filter medium according to claim 4, wherein the polyester fibers are copolymerized with a flame retardant.

8. The flame-resistant filter medium according to claim 4, wherein the polyester fiber material is a filaments nonwoven fabric.

9. An air filter unit comprising an air permeable supporting material on at least one surface of a polytetrafluoroethylene (PTFE) porous film; wherein a filter medium is bent in wave form and is in a supporting body, and a periphery is sealed; and wherein said filter medium has a maximum carbonized length of 150 mm or less when tested according to the Standard of Test Method for Combustion of Air Filter Media (JACA No. 11-1977) and a pressure loss of 10–100 mmH$_2$O when air permeates the filter medium at a flow velocity of 5.3 cm/second.

10. The flame-resistant filter medium according to claim 1, wherein said filter medium is used in a HEPA filter or an ULPA filter.

* * * * *